US011489352B2

(12) United States Patent
Allen et al.

(10) Patent No.: US 11,489,352 B2
(45) Date of Patent: **\*Nov. 1, 2022**

(54) SYSTEM AND METHOD FOR CHARGING A BARCODE SCANNER

(71) Applicant: Hand Held Products, Inc., Charlotte, NC (US)

(72) Inventors: Christopher Allen, East Windsor, NJ (US); Stephen J. Colavito, Garnet Valley, PA (US); Thomas Haggerty, Collingswood, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,995

(22) Filed: Sep. 10, 2020

(65) Prior Publication Data

US 2020/0412144 A1 Dec. 31, 2020

Related U.S. Application Data

(63) Continuation of application No. 16/004,717, filed on Jun. 11, 2018, now Pat. No. 10,804,718, which is a continuation of application No. 14/990,861, filed on Jan. 8, 2016, now Pat. No. 9,997,935.

(60) Provisional application No. 62/101,242, filed on Jan. 8, 2015.

(51) Int. Cl.
*H02J 7/00* (2006.01)

(52) U.S. Cl.
CPC ........ *H02J 7/0044* (2013.01); *H02J 7/00038* (2020.01)

(58) Field of Classification Search
CPC ..... H02J 7/00047; H02J 7/0006; H02J 7/0044
See application file for complete search history.

(56) References Cited

U.S. PATENT DOCUMENTS

| 5,164,652 | A | * | 11/1992 | Johnson | ................. | H02J 7/008 |
| | | | | | | 320/106 |
| 5,939,856 | A | | 8/1999 | Demuro et al. | | |
| 6,222,343 | B1 | | 4/2001 | Crisp et al. | | |

(Continued)

FOREIGN PATENT DOCUMENTS

| WO | 2013/163789 A1 | 11/2013 |
| WO | 2013/173985 A1 | 11/2013 |

(Continued)

OTHER PUBLICATIONS

U.S. Appl. No. 16/004,717, filed Jun. 11, 2018, U.S. Pat. No. 10,804,718, Patented.

(Continued)

*Primary Examiner* — David V Henze-Gongola
(74) *Attorney, Agent, or Firm* — Alston & Bird LLP

(57) ABSTRACT

Cordless indicia readers may use a rechargeable energy storage unit (RESU) for power. The RESU may include either at least one lithium-ion battery or at least one super capacitor. Problems may arise when an RESU containing a lithium-ion battery is charged using a super-capacitor charging-scheme. The present invention embraces a system and method for charging a barcode scanner that includes determining the RESU type and then charging the RESU with a charging process that is appropriate for the RESU type.

20 Claims, 5 Drawing Sheets

(56) References Cited

U.S. PATENT DOCUMENTS

| | | |
|---|---|---|
| 6,430,517 B1 | 8/2002 | Williams |
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |

(56) References Cited

U.S. PATENT DOCUMENTS

| | | |
|---|---|---|
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,660 B2 | 2/2016 | Lu et al. |
| 9,262,662 B2 | 2/2016 | Chen et al. |
| 9,262,664 B2 | 2/2016 | Soule et al. |
| 9,269,036 B2 | 2/2016 | Bremer |
| 9,270,782 B2 | 2/2016 | Hala et al. |
| 9,274,806 B2 | 3/2016 | Barten |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,282,501 B2 | 3/2016 | Wang et al. |
| 9,286,496 B2 | 3/2016 | Smith |
| 9,292,969 B2 | 3/2016 | Laffargue et al. |
| 9,297,900 B2 | 3/2016 | Jiang |
| 9,298,667 B2 | 3/2016 | Caballero |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,342,827 B2 | 5/2016 | Smith |
| 9,355,294 B2 | 5/2016 | Smith et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,367,722 B2 | 6/2016 | Xian et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,411,386 B2 | 8/2016 | Sauerwein, Jr. |
| 9,412,242 B2 | 8/2016 | Van et al. |

(56) References Cited

U.S. PATENT DOCUMENTS

| | | | |
|---|---|---|---|
| 9,418,252 | B2 | 8/2016 | Nahill et al. |
| 9,418,269 | B2 | 8/2016 | Havens et al. |
| 9,418,270 | B2 | 8/2016 | Van et al. |
| 9,423,318 | B2 | 8/2016 | Liu et al. |
| D766,244 | S | 9/2016 | Zhou et al. |
| 9,443,123 | B2 | 9/2016 | Hejl |
| 9,443,222 | B2 | 9/2016 | Singel et al. |
| 9,448,610 | B2 | 9/2016 | Davis et al. |
| 9,454,689 | B2 | 9/2016 | McCloskey et al. |
| 9,464,885 | B2 | 10/2016 | Lloyd et al. |
| 9,465,967 | B2 | 10/2016 | Xian et al. |
| 9,478,113 | B2 | 10/2016 | Xie et al. |
| 9,478,983 | B2 | 10/2016 | Kather et al. |
| D771,631 | S | 11/2016 | Fitch et al. |
| 9,481,186 | B2 | 11/2016 | Bouverie et al. |
| 9,488,986 | B1 | 11/2016 | Solanki |
| 9,489,782 | B2 | 11/2016 | Payne et al. |
| 9,490,540 | B1 | 11/2016 | Davies et al. |
| 9,491,729 | B2 | 11/2016 | Rautiola et al. |
| 9,497,092 | B2 | 11/2016 | Gomez et al. |
| 9,507,974 | B1 | 11/2016 | Todeschini |
| 9,519,814 | B2 | 12/2016 | Cudzilo |
| 9,521,331 | B2 | 12/2016 | Bessettes et al. |
| 9,530,038 | B2 | 12/2016 | Xian et al. |
| D777,166 | S | 1/2017 | Bidwell et al. |
| 9,558,386 | B2 | 1/2017 | Yeakley |
| 9,572,901 | B2 | 2/2017 | Todeschini |
| 9,582,696 | B2 | 2/2017 | Barber et al. |
| 9,606,581 | B1 | 3/2017 | Howe et al. |
| D783,601 | S | 4/2017 | Schulte et al. |
| 9,616,749 | B2 | 4/2017 | Chamberlin |
| 9,618,993 | B2 | 4/2017 | Murawski et al. |
| D785,617 | S | 5/2017 | Bidwell et al. |
| D785,636 | S | 5/2017 | Oberpriller et al. |
| 9,646,189 | B2 | 5/2017 | Lu et al. |
| 9,646,191 | B2 | 5/2017 | Unemyr et al. |
| 9,652,648 | B2 | 5/2017 | Ackley et al. |
| 9,652,653 | B2 | 5/2017 | Todeschini et al. |
| 9,656,487 | B2 | 5/2017 | Ho et al. |
| 9,659,198 | B2 | 5/2017 | Giordano et al. |
| D790,505 | S | 6/2017 | Vargo et al. |
| D790,546 | S | 6/2017 | Zhou et al. |
| D790,553 | S | 6/2017 | Fitch et al. |
| 9,680,282 | B2 | 6/2017 | Hanenburg |
| 9,697,401 | B2 | 7/2017 | Feng et al. |
| 9,701,140 | B1 | 7/2017 | Alaganchetty et al. |
| 9,715,614 | B2 | 7/2017 | Todeschini et al. |
| 9,734,493 | B2 | 8/2017 | Gomez et al. |
| 9,997,935 | B2 | 6/2018 | Allen et al. |
| 10,019,334 | B2 | 7/2018 | Caballero et al. |
| 10,021,043 | B2 | 7/2018 | Sevier |
| 10,327,158 | B2 | 6/2019 | Wang et al. |
| 10,410,029 | B2 | 9/2019 | Powilleit |
| 10,804,718 | B2 * | 10/2020 | Allen ................ H02J 7/00038 |
| 2004/0091769 | A1 | 5/2004 | Kawabata et al. |
| 2006/0192015 | A1 * | 8/2006 | DiGiovanna .......... G01R 31/68 |
| | | | 235/472.02 |
| 2007/0063048 | A1 | 3/2007 | Havens et al. |
| 2008/0185432 | A1 | 8/2008 | Caballero et al. |
| 2008/0198898 | A1 * | 8/2008 | Taylor .................... G01K 7/24 |
| | | | 374/163 |
| 2009/0134221 | A1 | 5/2009 | Zhu et al. |
| 2010/0177076 | A1 | 7/2010 | Essinger et al. |
| 2010/0177080 | A1 | 7/2010 | Essinger et al. |
| 2010/0177707 | A1 | 7/2010 | Essinger et al. |
| 2010/0177749 | A1 | 7/2010 | Essinger et al. |
| 2010/0265880 | A1 | 10/2010 | Rautiola et al. |
| 2011/0169999 | A1 | 7/2011 | Grunow et al. |
| 2011/0202554 | A1 | 8/2011 | Powilleit et al. |
| 2012/0111946 | A1 | 5/2012 | Golant |
| 2012/0116379 | A1 * | 5/2012 | Yates .................... H01M 10/48 |
| | | | 606/33 |
| 2012/0168511 | A1 | 7/2012 | Kotlarsky et al. |
| 2012/0168512 | A1 | 7/2012 | Kotlarsky et al. |
| 2012/0193423 | A1 | 8/2012 | Samek |
| 2012/0203647 | A1 | 8/2012 | Smith |
| 2012/0223141 | A1 | 9/2012 | Good et al. |
| 2012/0228382 | A1 | 9/2012 | Havens et al. |
| 2012/0248188 | A1 | 10/2012 | Kearney |
| 2013/0043312 | A1 | 2/2013 | Van Horn |
| 2013/0075168 | A1 | 3/2013 | Amundsen et al. |
| 2013/0082104 | A1 | 4/2013 | Kearney et al. |
| 2013/0175341 | A1 | 7/2013 | Kearney et al. |
| 2013/0175343 | A1 | 7/2013 | Good |
| 2013/0257744 | A1 | 10/2013 | Daghigh et al. |
| 2013/0257759 | A1 | 10/2013 | Daghigh |
| 2013/0270346 | A1 | 10/2013 | Xian et al. |
| 2013/0287258 | A1 | 10/2013 | Kearney |
| 2013/0292475 | A1 | 11/2013 | Kotlarsky et al. |
| 2013/0292477 | A1 | 11/2013 | Hennick et al. |
| 2013/0293539 | A1 | 11/2013 | Hunt et al. |
| 2013/0293540 | A1 | 11/2013 | Laffargue et al. |
| 2013/0306728 | A1 | 11/2013 | Thuries et al. |
| 2013/0306731 | A1 | 11/2013 | Pedrao |
| 2013/0307964 | A1 | 11/2013 | Bremer et al. |
| 2013/0308625 | A1 | 11/2013 | Park et al. |
| 2013/0313324 | A1 | 11/2013 | Koziol et al. |
| 2013/0313325 | A1 | 11/2013 | Wilz et al. |
| 2013/0332524 | A1 | 12/2013 | Fiala et al. |
| 2013/0342717 | A1 | 12/2013 | Havens et al. |
| 2014/0001267 | A1 | 1/2014 | Giordano et al. |
| 2014/0002828 | A1 | 1/2014 | Laffargue et al. |
| 2014/0008439 | A1 | 1/2014 | Wang |
| 2014/0025584 | A1 | 1/2014 | Liu et al. |
| 2014/0034734 | A1 | 2/2014 | Sauerwein, Jr. |
| 2014/0036848 | A1 | 2/2014 | Pease et al. |
| 2014/0039693 | A1 | 2/2014 | Havens et al. |
| 2014/0042814 | A1 | 2/2014 | Kather et al. |
| 2014/0049120 | A1 | 2/2014 | Kohtz et al. |
| 2014/0049635 | A1 | 2/2014 | Laffargue et al. |
| 2014/0061306 | A1 | 3/2014 | Wu et al. |
| 2014/0063289 | A1 | 3/2014 | Hussey et al. |
| 2014/0066136 | A1 | 3/2014 | Sauerwein et al. |
| 2014/0067692 | A1 | 3/2014 | Ye et al. |
| 2014/0070005 | A1 | 3/2014 | Nahill et al. |
| 2014/0071840 | A1 | 3/2014 | Venancio |
| 2014/0074746 | A1 | 3/2014 | Wang |
| 2014/0076974 | A1 | 3/2014 | Havens et al. |
| 2014/0078341 | A1 | 3/2014 | Havens et al. |
| 2014/0078342 | A1 | 3/2014 | Li et al. |
| 2014/0078345 | A1 | 3/2014 | Showering |
| 2014/0097249 | A1 | 4/2014 | Gomez et al. |
| 2014/0098792 | A1 | 4/2014 | Wang et al. |
| 2014/0100774 | A1 | 4/2014 | Showering |
| 2014/0100813 | A1 | 4/2014 | Showering |
| 2014/0103115 | A1 | 4/2014 | Meier et al. |
| 2014/0104413 | A1 | 4/2014 | McCloskey et al. |
| 2014/0104414 | A1 | 4/2014 | McCloskey et al. |
| 2014/0104416 | A1 | 4/2014 | Giordano et al. |
| 2014/0104451 | A1 | 4/2014 | Todeschini et al. |
| 2014/0106594 | A1 | 4/2014 | Skvoretz |
| 2014/0106725 | A1 | 4/2014 | Sauerwein, Jr. |
| 2014/0108010 | A1 | 4/2014 | Maltseff et al. |
| 2014/0108402 | A1 | 4/2014 | Gomez et al. |
| 2014/0108682 | A1 | 4/2014 | Caballero |
| 2014/0110485 | A1 | 4/2014 | Toa et al. |
| 2014/0114530 | A1 | 4/2014 | Fitch et al. |
| 2014/0124577 | A1 | 5/2014 | Wang et al. |
| 2014/0124579 | A1 | 5/2014 | Ding |
| 2014/0125842 | A1 | 5/2014 | Winegar |
| 2014/0125853 | A1 | 5/2014 | Wang |
| 2014/0125999 | A1 | 5/2014 | Longacre et al. |
| 2014/0129378 | A1 | 5/2014 | Richardson |
| 2014/0131438 | A1 | 5/2014 | Kearney |
| 2014/0131441 | A1 | 5/2014 | Nahill et al. |
| 2014/0131443 | A1 | 5/2014 | Smith |
| 2014/0131444 | A1 | 5/2014 | Wang |
| 2014/0131445 | A1 | 5/2014 | Ding et al. |
| 2014/0131448 | A1 | 5/2014 | Xian et al. |
| 2014/0133379 | A1 | 5/2014 | Wang et al. |
| 2014/0136208 | A1 | 5/2014 | Maltseff et al. |
| 2014/0140585 | A1 | 5/2014 | Wang |
| 2014/0151453 | A1 | 6/2014 | Meier et al. |
| 2014/0152882 | A1 | 6/2014 | Samek et al. |

(56) References Cited

U.S. PATENT DOCUMENTS

| | | |
|---|---|---|
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0277337 A1 | 9/2014 | Chen |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0283282 A1 | 9/2014 | Dye et al. |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley et al. |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |

(56) References Cited

U.S. PATENT DOCUMENTS

| | | |
|---|---|---|
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0200108 A1 | 7/2017 | Au et al. |
| 2017/0200275 A1 | 7/2017 | McCloskey et al. |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

U.S. Appl. No. 14/990,861, filed Jan. 8, 2016, U.S. Pat. No. 9,997,935, Patented.

Advisory Action (PTOL-303) dated Jan. 13, 2020 for U.S. Appl. No. 16/004,717.

Examiner initiated interview summary (PTOL-413B) dated Jan. 13, 2020 for U.S. Appl. No. 16/004,717.

Final Rejection dated Oct. 11, 2019 for U.S. Appl. No. 16/004,717.

Non-Final Rejection dated Jul. 3, 2017 for U.S. Appl. No. 14/990,861.

Non-Final Rejection dated Jun. 3, 2019 for U.S. Appl. No. 16/004,717.

Non-Final Rejection dated Mar. 3, 2020 for U.S. Appl. No. 16/004,717.

Notice of Allowance and Fees Due (PTOL-85) dated Feb. 9, 2018 for U.S. Appl. No. 14/990,861.

Notice of Allowance and Fees Due (PTOL-85) dated Feb. 27, 2018 for U.S. Appl. No. 14/990,861.

Notice of Allowance and Fees Due (PTOL-85) dated Jul. 30, 2020 for U.S. Appl. No. 16/004,717.

Notice of Allowance and Fees Due (PTOL-85) dated Jun. 10, 2020 for U.S. Appl. No. 16/004,717.

U.S. Patent Application for Indicia Reader filed Apr. 1, 2015 (Huck), U.S. Appl. No. 14/676,109, now abandoned.

U.S. Patent Application for Multifunction Point of Sale Apparatus With Optical Signature Capture filed Jul. 30, 2014 (Good et al.), U.S. Appl. No. 14/446,391, now abandoned.

U.S. Patent Application for Multipurpose Optical Reader, filed May 14, 2014 (Jovanovski et al.); 59 pages; U.S. Appl. No. 14/277,337; now abandoned.

U.S. Patent Application for Terminal Having Illumination and Focus Control filed May 21, 2014 (Liu et al.), U.S. Appl. No. 14/283,282, now abandoned.

(56) References Cited

OTHER PUBLICATIONS

U.S. Appl. No. 13/367,978 for Laser Scanning Module Employing an Elastomeric U-Hinge Based Laser Scanning Assembly, filed Feb. 7, 2012, (Feng et al.); now abandoned.

* cited by examiner

(12) United States Patent
US 11,489,352 B2

SYSTEM AND METHOD FOR CHARGING A BARCODE SCANNER

CROSS-REFERENCE TO RELATED APPLICATIONS

The present application is a continuation of U.S. Non-Provisional application Ser. No. 16/004,717, filed Jun. 11, 2018, which is a continuation and claims the benefit of U.S. patent application Ser. No. 14/990,861 for a System and Method for Charging a Barcode Scanner filed Jan. 8, 2016 (and published Jul. 14, 2016 as U.S. Patent Application Publication No. 2016/0204636), now U.S. Pat. No. 9,997,935, which claims the benefit of U.S. Patent Provisional Application No. 62/101,242 for a Power Source Pack Detection filed Jan. 8, 2015. Each of the foregoing patent applications, patent publication, and patent is hereby incorporated by reference in its entirety.

FIELD OF THE INVENTION

The present invention relates to chargers for charging a rechargeable energy storage unit (RESU). More specifically, the present invention relates to a charger for a barcode scanner that is configured to detect the barcode-scanner's RESU type and then choose a charging scheme (i.e., charging process) appropriate for the particular RESU type.

BACKGROUND

Handheld and/or wireless barcode scanners (i.e., indicia readers) are typically powered by a rechargeable energy storage unit (RESU). Traditionally the RESU has used a battery as its energy storage component. Batteries are optimized to provide energy for prolonged periods of continuous operation, which suits the needs for most electronic devices (e.g., laptops, cellphones, etc.). Barcode scanners, however, typically operate in a different fashion. Active periods are often followed by periods of non-operation. As a result, other energy storage components may be considered for powering the barcode scanner. A super capacitor (i.e., ultra-capacitor, double layer capacitor, etc.), for example, may be suitable energy storage component for an RESU.

The super capacitor stores energy via a static charge rather than an electrochemical reaction or other process. As a result, the charging/operating characteristics required for super-capacitor RESUs is different from battery RESUs. For example, a super-capacitor can be charged more quickly than a lithium-ion (Li-ion) battery. The super capacitor may be charged/discharged many times and typically has a longer service life than a Li-ion battery. As a result, super capacitors may be used for barcode scanning applications, which may require short-term power bursts followed by quick charging periods.

The charging process (i.e., the currents/voltages applied over time) of a super capacitor are different from a Li-ion battery. For example, the super capacitor may accept larger charge currents. The super capacitor cannot be overcharged and does not require the detection of a full-charge since the charge current stops flowing when the super capacitor has reached its charge limit. A Li-ion battery, on the other hand, requires careful control of charging current/voltage, and care should be taken to stop charging when the battery has reached its charge limit. In addition, safety mandates that the temperature of a Li-ion battery be monitored and the charge/use of the Li-ion battery discontinued when the battery becomes excessively warm.

Either a Li-ion battery or a super capacitor may be used to as the energy storage component in a barcode-scanner's RESU. It is desirable for an RESU to fit/operate in any barcode-scanner/charger without regard to the type of energy storage component used by the RESU. Additional mechanical keying features added to an RESU to indicate the RESU type (i.e., super-capacitor type or battery type) add additional costs and may cause user frustration. One detectable difference between a super-capacitor-type RESU and a battery-type RESU (e.g., Li-ion type RESU) arises from the temperature sensor (e.g., thermistor) required for temperature control in the battery-type RESU.

Traditionally, RESUs have an electrical connector (e.g., pin, tab, contact, etc.) specifically for monitoring temperature. Typically, this connector (i.e., thermistor pin) is connected to a thermistor within the RESU. Temperature may be detected by sensing the thermistor's resistance (i.e., the terminal resistance at the thermistor pin) since the thermistor's resistance varies with temperature (e.g., 10K ohms at room temperature). For a super-capacitor RESU, however, this pin may be shorted since temperature control is unnecessary. As a result, a super-capacitor RESU and a Li-ion RESU may be visually identical but will have different terminal resistances at their respective thermistor pins.

Therefore, a need exists for a charger that can detect what type of RESU is being charged based on the terminal resistance at the RESU's thermistor pin and then adjust the charging process based on the type of RESU detected.

SUMMARY

Accordingly, in one aspect, the present invention embraces a method for selecting a charging process. The method includes the step of providing a barcode scanner that has a particular type of rechargeable storage unit (RESU). The method also includes the step of connecting the RESU to a charger that can charge the RESU with a charging process customized for the RESU's particular type. The charger includes a detection circuit, and the method includes the step of detecting the RESU's particular type using the detection circuit connected to a thermistor pin on the RESU. Finally, the method includes the step of selecting the charger's charging process based on the RESU's particular type.

In an exemplary embodiment of the method, the RESU's particular type is either (i) a super-capacitor type that includes one or more supercapacitors for storing energy or (ii) a battery type that includes one or more batteries (e.g., one or more Li-ion batteries) for storing energy. Further, in one possible embodiment, the shape/size and electrical interface of the RESU is the same for each type.

In another exemplary embodiment of the method, the step of detecting the RESU's particular type includes measuring a terminal resistance, which is the resistance of a thermistor.

In another exemplary embodiment of the method, the RESU's particular type is either a super-capacitor type with a terminal resistance of about zero ohms or a battery type with a terminal resistance of about 10,000 ohms.

In another exemplary embodiment of the method, the detection circuit includes a P-channel MOSFET. The P-channel MOSFET's source is connected to a power source, while the MOSFET's drain is connected to the input of a current limiting resistor. The detection circuit also includes an analog-to-digital converter (ADC). The input to the ADC is connected to the output of the current-limiting resistor and the RESU's thermistor pin so that the terminal resistance may be measured as a voltage, and the output of the ADC is connected to a processor, which is included as part of the charger to control the charger's charging process. Here, the processor may be configured by software to (i) read the digital signal output from the ADC, (ii) select the charger's charging process based on the digital signal, and (iii) control charging circuitry to apply voltage/current to the RESU based on the selected charging process.

In another exemplary embodiment of the method, the charger is a charging cradle that is configured to hold and charge the RESU.

In another exemplary embodiment of the method, the charger is a charging cradle that is configured to hold and charge the RESU while the RESU is connected to the barcode scanner.

In another aspect, the present invention embraces a charging system for charging a wireless barcode scanner. The charging system includes a wireless barcode scanner having an RESU. The charging system also includes a charger that is configured to electrically connect to the RESU for charging. The charger includes a detection circuit to determine the RESU's energy storage component. The charger also includes a processor that is configured to (i) receive a signal from the detection circuit, (ii) determine the RESU's energy storage component based on the signal, and (iii) charge the RESU's energy storage component based on the determination. The charging of the RESU's energy storage component includes the processor controlling charging circuitry to delivery energy to the RESU according to a charging process that corresponds to the RESU's energy storage component.

In one exemplary embodiment of the charging system, the RESU's storage component is either one or more super capacitors or one or more lithium-ion batteries.

In another exemplary embodiment of the charging system, the RESU having one or more super capacitors is visibly identical to the RESU having one or more lithium-ion batteries.

In another exemplary embodiment of the charging system, the RESU's storage component corresponds to a terminal resistance at a thermistor pin on the RESU.

In another exemplary embodiment of the charging system, the terminal resistance for an energy storage component having one or more lithium-ion batteries is the resistance of a thermistor.

In another exemplary embodiment of the charging system, the terminal resistance for an energy storage component having one or more super capacitors is the resistance of a short-circuit to ground.

In another exemplary embodiment of the charging system, the terminal resistance for an energy storage component having one or more super capacitors and the terminal resistance for an energy storage component having one or more lithium-ion batteries differ by more than 1000 ohms.

In another exemplary embodiment of the charging system, the detection circuit converts the terminal resistance at the thermistor pin into a corresponding voltage level signal. In one particular embodiment, the detection circuit includes a P-channel MOSFET and an analog-to-digital converter (ADC). The MOSFET's source is connected to a power source, while the MOSFET's drain is connected to the input of a current-limiting resistor so that current flows through the current limiting resistor when the MOSFET is turned on for detection. The ADC's input is connected to the output of the current-limiting resistor and the thermistor pin on the RESU so that the voltage at the input ADC corresponds to the terminal resistance. The digital signal at the output of the ADC corresponds to the voltage at the ADC's input.

In another exemplary embodiment of the charging system, the charger is a charging cradle having a housing configured to mechanically and electrically mate with the RESU. The housing also contains the detection circuit, the processor, and the charging circuitry.

The foregoing illustrative summary, as well as other exemplary objectives and/or advantages of the invention, and the manner in which the same are accomplished, are further explained within the following detailed description and its accompanying drawings.

DETAILED DESCRIPTION

In one regard, the present invention embraces a system for charging a rechargeable storage unit (RESU). The RESU is configured to store energy upon charging and to deliver power to a barcode scanner during the scanner's operation. The RESU may store energy in a battery or a supercapacitor. It is desirable for an RESU using a battery as its energy storage component to be indistinguishable (i.e., in its mechanical structure and electrical interface) from an RESU using a super capacitor as the energy storage component. The charging requirements (e.g., voltages/currents applied over time) of a battery are different from those of a super capacitor, and charging a battery using a super-capacitor charging process (or vice versa) could result in damage. The present invention embraces a system to sense the RESU type and then to charge the RESU using the appropriate charging process based on the RESU type.

Figure 1A:
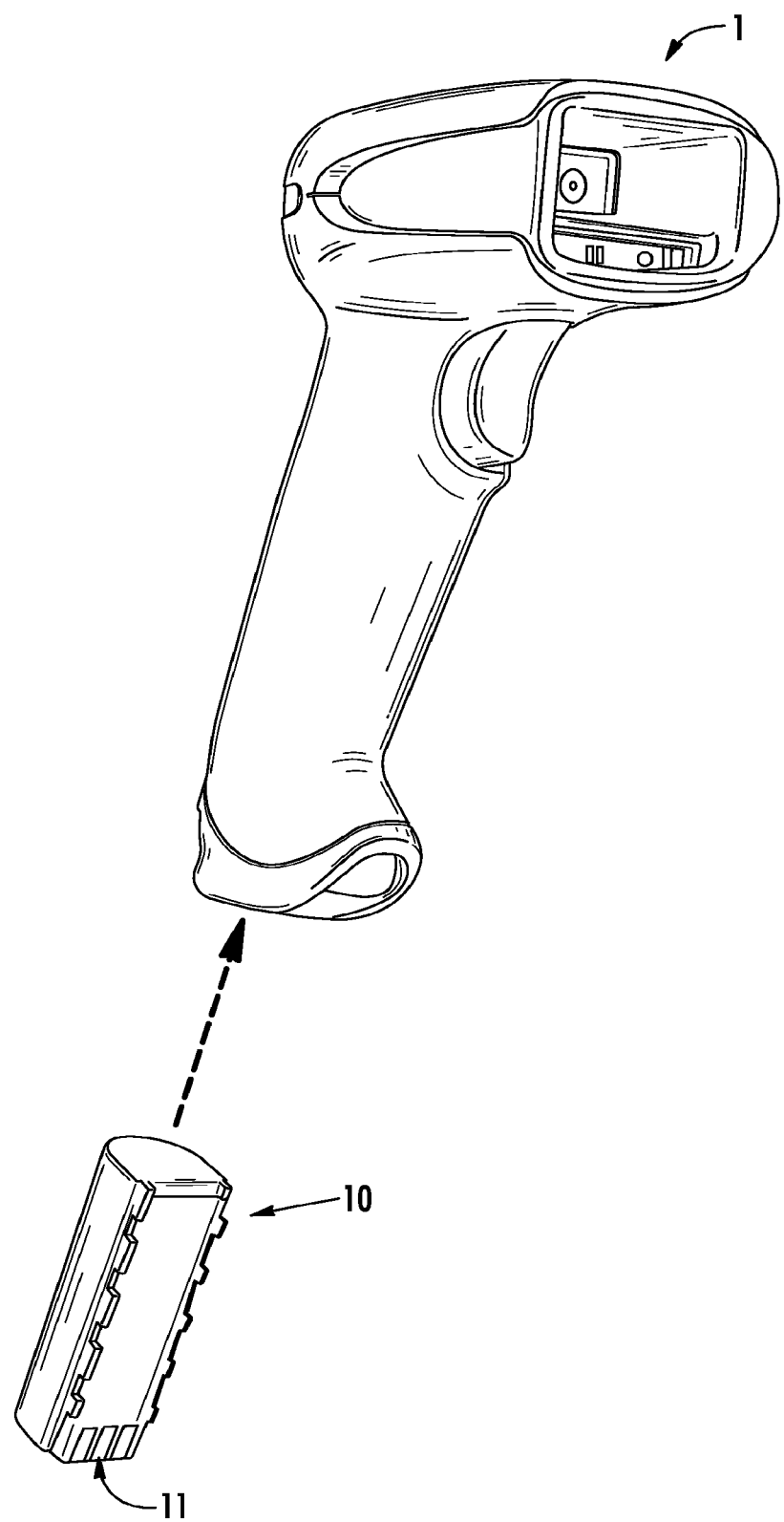
FIG. 1a depicts an exploded view of a barcode scanner and a rechargeable energy storage unit (RESU) according to an embodiment of the present invention.

An exemplary barcode scanner 1 is shown in FIG. 1a. The barcode scanner shown is intended for wireless, handheld use and scanning may be achieved by pulling a trigger. The barcode scanner may be configured to scan barcodes (e.g., 1D barcodes, 2D barcodes, etc.) or perform other operations, such as optical character recognition or validation (e.g., currency, identification). The term "barcode scanner" as used herein is not intended to limit the scope of present invention to a particular type of indicium (e.g., barcode) that can be scanned or to a particular means for reading (e.g., scanning, imaging) the indicium. The barcode scanner may be a gun-style as shown in FIG. 1, but may be embodied otherwise (e.g., body-worn type, mobile-computer type, vehicle-mounted type, sled type, etc.).

Also shown in FIG. 1a is an RESU 10. The RESU 10, in this example, may be inserted into the handle of the barcode scanner 1 as illustrated by the dashed arrow. The RESU has electrical connectors 11 (e.g., pins, tabs, sockets, etc.) to interface with a charger. These electrical connectors may include (but are not limited to) a positive pin, a negative pin (e.g., ground pin), and a thermistor pin.

Figure 1B:
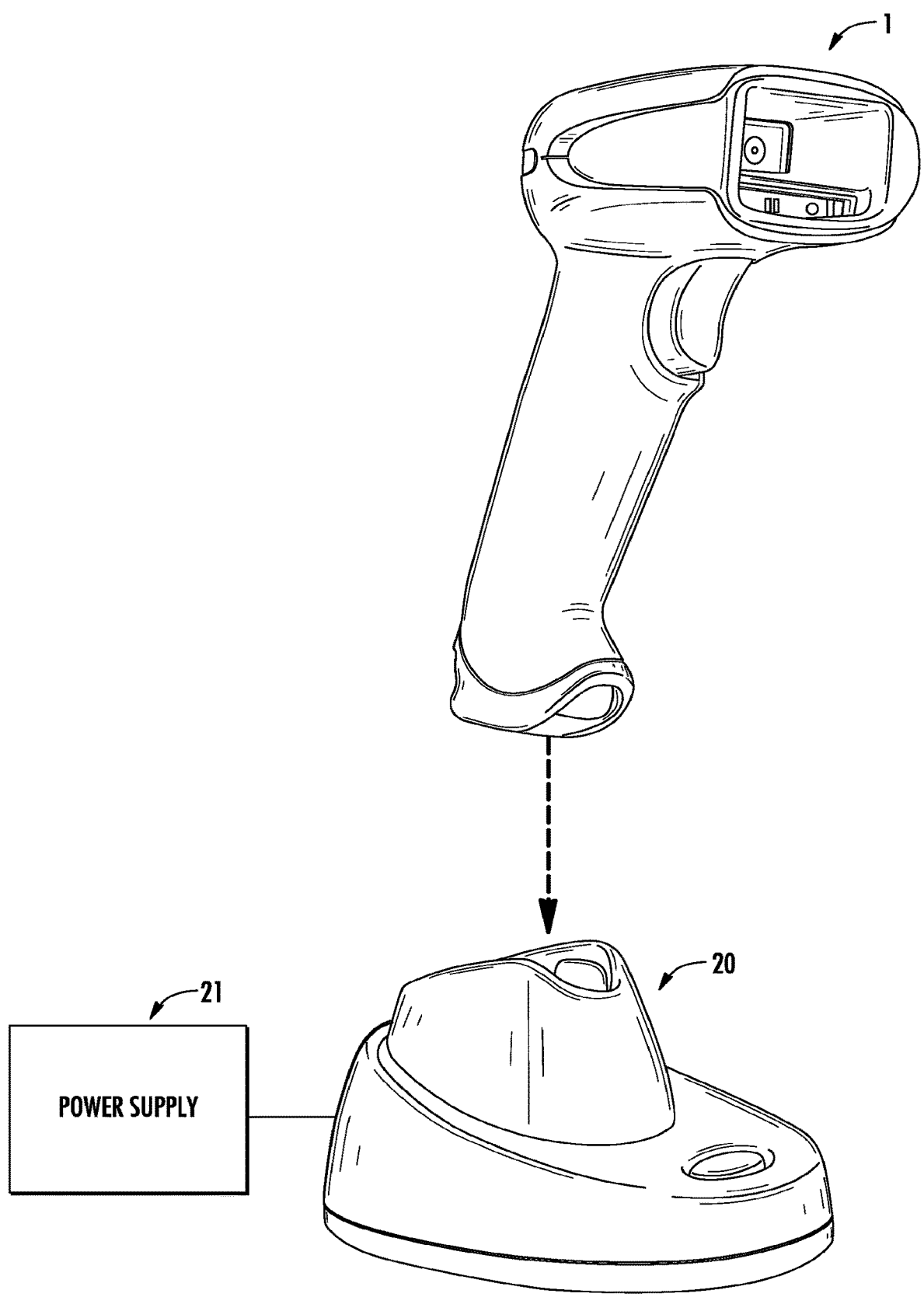
FIG. 1b graphically depicts a barcode scanner, a charger, and a power supply according to an exemplary implementation of the present invention.

An implementation of an exemplary charging system for charging is shown in FIG. 1B. As shown, a barcode scanner 1 having an RESU installed (e.g., in the handle) may be placed (i.e., as shown by the dotted arrow) onto a charger 20. The charger shown in FIG. 1B is a charging cradle that holds the RESU 10 (and barcode scanner 1), while electrically connecting with the RESU connectors 11. The charger 20 may be connected to a power supply. The power supply may include an infrastructure power source (e.g., power at a wall outlet) and the necessary circuitry to convert/condition the electricity available from the infrastructure into voltages/currents suitable for the charger. In one possible embodiment, the power supply is contained within the charger's housing so that the charger may connected directly to a wall outlet. In another possible embodiment, the power supply is a battery.

The charging system envisioned by the present invention is not limited to the configuration shown in FIG. 1B. The present invention also envisions a charging system in which the RESU is inserted directly into the charger after its removal from the barcode scanner. In another possible embodiment, the charger includes multiple charging bays, each configured to charge an RESU. In another possible embodiment, the charger is mechanically shaped (i.e., keyed) to accept a particular RESU shape or accept a particular orientation of the RESU. In another possible embodiment, the charger includes indicators and/or a display to show the conditions of the charger/RESU (e.g., the sensed RESU type, the charging process type, the charging status, etc.).

Figure 2:
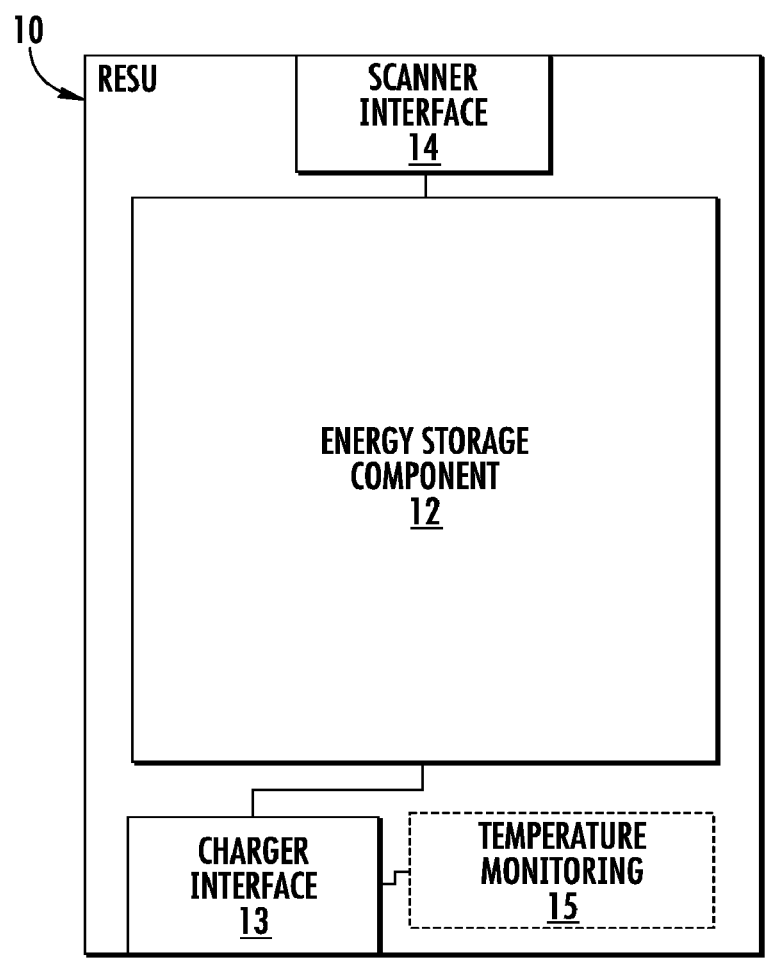
FIG. 2 schematically depicts a block diagram of an RESU according to an embodiment of the present invention.

A block diagram of an exemplary RESU is shown in FIG. 2. The RESU includes an energy storage element capable being charged and recharged. The energy storage element includes either a super capacitor or a battery (e.g., lithium ion battery). An RESU with at least one super capacitor is a super-capacitor type RESU, while an RESU with at least one Li-ion battery is a battery-type RESU. In some cases, the energy storage component may be embodied as a bank of super capacitors that are electrically connected so as to operate as a unit. In other cases, the energy storage component may be embodied as a bank of Li-ion batteries that are electrically connected so as to operate as a unit.

The RESU includes a scanner interface 14 to electrically connect with the barcode scanner. The RESU also includes a charger interface 13 to electrically connect with a charger. In some cases, the scanner interface and the charger interface are included in a single interface.

For a battery-type RESU, temperature-monitoring 15 may be included. The temperature monitoring 15 may include a thermistor that has a temperature-dependent resistance. By sensing the thermistor's resistance, the RESU's temperature may be monitored (e.g., 10000 ohms at room temperature). For a super-capacitor type RESU, temperature monitoring is typically unnecessary. As a result, the temperature monitoring 15 may be eliminated or replaced.

In super-capacitor RESUs, replacing the thermistor with another circuit element can facilitate the identification of different RESU types. In one possible embodiment the thermistor may be replaced with a short circuit (e.g. to ground). In another possible embodiment, the thermistor may be replaced with an open circuit. In another possible embodiment, the thermistor may be replaced with a particular resistance (e.g., so that the terminal resistance difference between the RESU types is greater than about 1000 ohms).

Figure 3:
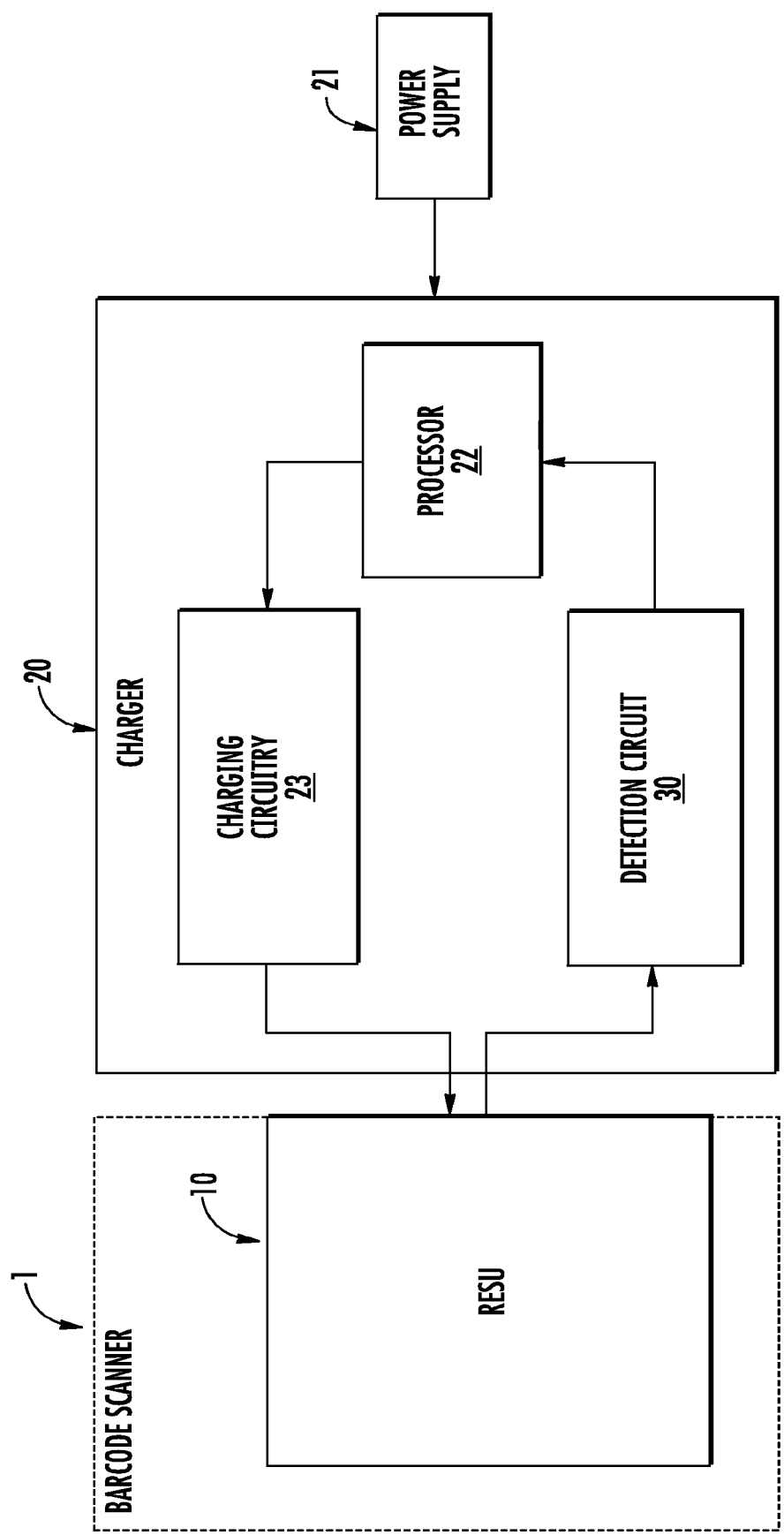
FIG. 3 depicts a block diagram of a charging system for a barcode scanner according to an embodiment of the present invention.

A block diagram illustrating an exemplary charging system is shown in FIG. 3. The RESU 10 is electrically connected to a charger 20 that is also electrically connected to a power supply 21. In some possible embodiments, the RESU may also be connected mechanically and/or electrically to a barcode scanner 1.

The charger 20 includes a detection circuit 30. When connected to the RESU's thermistor pin (i.e., connector, port, etc.), the terminal resistance may be measured. An RESU including at least one lithium-ion (Li-ion) battery also includes a thermistor connected to the thermistor pin so that the terminal resistance measured at the thermistor pin corresponds with the temperature inside the RESU housing (e.g., about 10,000 ohms at room temperature). An RESU that includes no Li-ion batteries (i.e., super-capacitor type RESU) does not require temperature monitoring, therefore the thermistor may be replaced with circuit element having a different resistance (e.g., open-circuit, short-circuit, resistor, etc.). By detecting the resistance of the thermistor or the circuit element, the RESU type (i.e., super-capacitor or battery) may be determined.

Figure 4:
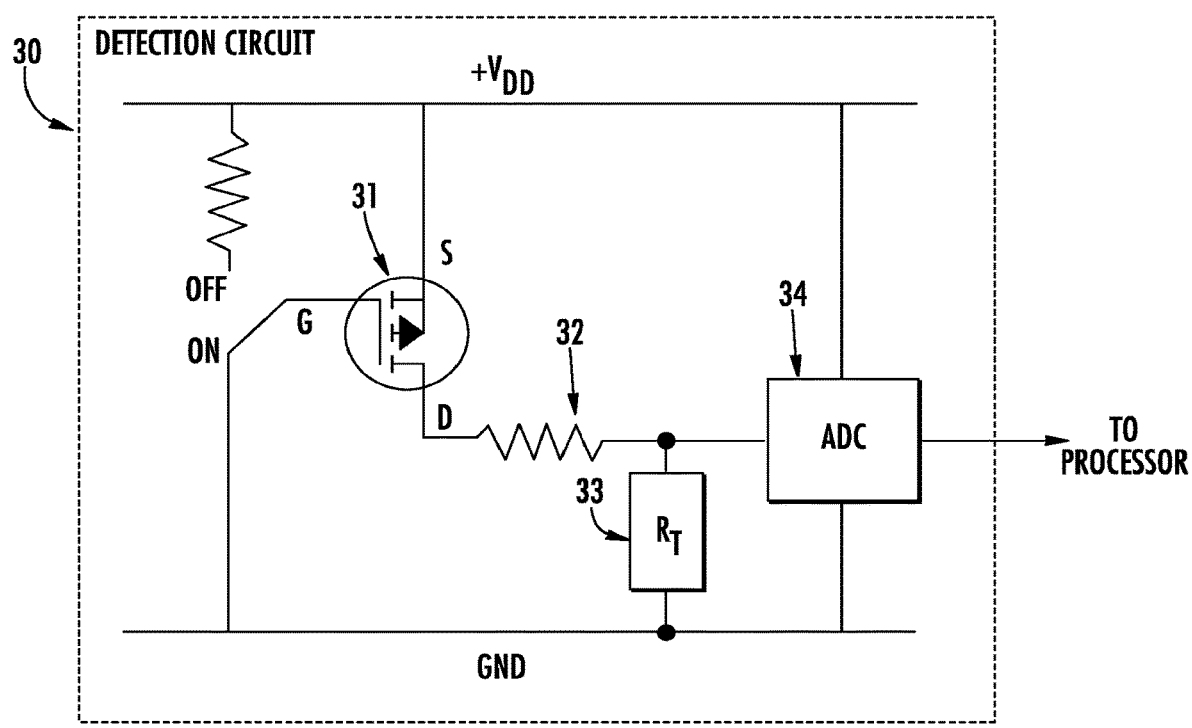
FIG. 4 schematically depicts a detection circuit for a charger according to an embodiment of the present invention.

An exemplary detection circuit 30 is schematically shown in FIG. 4. Here, a P-Channel MOSFET 31 may be used. The MOSFET's source lead (S) is connected to a power source, and the MOSFET's drain (D) lead is connected to the input of a current-limiting resistor 32. The output of the current-limiting resistor 32 is attached to an analog-to-digital converter (ADC) 34 input and to the RESU's thermistor pin. The voltage drop across the terminal resistance ($R_T$) 33 measured at the thermistor pin, corresponds to the type of RESU. Likewise, the output of the ACD is a (digital) voltage-level signal corresponding to the type of RESU. In the case of the Li-ion battery RESU, the ADC 34 output will be fairly high as the thermistor is around 10000 ohms at ambient temperature (e.g., 25 degrees Celsius). In the case of the super-capacitor RESU, the voltage will be near zero when the terminal resistance is a short circuit (i.e., short) to ground.

The gate terminal (G) for the P-channel (enhancement mode) MOSFET 31 may be connected to bias circuitry to start/stop the current flow through the current limiting resistor 32. This switching aspect may be used to activate/deactivate the sensing as necessary. Variations in the exemplary detection circuit 30 exist. For example, in one possible embodiment, the ADC 34 is part of a processor.

As shown in FIG. 3, the output of the detection circuit 30 is connected to the charger's processor 22. The processor may be of any type (e.g., microcontroller, microprocessor, FPGA, ASIC, CPU, etc.) that can be configured by software to perform various functions and/or control various devices, systems and/or components. For example, software may configure the processor to receive the output (e.g., digital signal representing the voltage input) of the detection circuit and determine the proper charging scheme based on the signal. The processor 22 may then be configured to perform the appropriate charging process by controlling charging circuitry 23 to deliver the appropriate voltage/current to the RESU over time.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;

U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;

U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;

U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for selecting a charging process, the method comprising:

connecting a rechargeable energy storage unit (RESU) to a charger, the charger comprises a detection circuit configured to interface with a pin on the RESU and to output a digital signal indicative of a terminal resistance (Rt) at the pin, wherein the detection circuit comprises of a MOSFET that further comprises a gate terminal, a source terminal, and a drain terminal, wherein the source terminal is connected to a power source, and the drain terminal is connected to a first end of a current-limiting resistor, wherein a second end of the current-limiting resistor is connected to an analog to digital (A/D) convertor and to a ground through the terminal resistance at the pin of the RESU, and wherein the digital signal indicates a voltage drop across the terminal resistance (Rt) and the voltage drop across the terminal resistance indicates a type of the RESU; and in response to determining that the voltage drop across the terminal resistance indicates a short-circuit, identifying the type of the RESU as a supercapacitor and configuring, based on the digital signal, a processor to perform a charging process for the supercapacitor.

2. The method according to claim 1, wherein the method further comprises obtaining the terminal resistance from a thermistor pin at least when the RESU comprises a battery.

3. The method according to claim 2, wherein the battery is a lithium-ion (Li-ion) battery.

4. The method according to claim 1, wherein the determining that the voltage drop across the terminal resistance indicates the short-circuit comprises determining that the voltage drop between the drain terminal and the ground corresponds to approximately zero ohms.

5. The method according to claim 1, wherein the short-circuit indicates a first terminal resistance value of the terminal resistance as approximately zero ohms.

6. The method according to claim 1, wherein the charging process is a first charging process, and the method further comprising:
configuring the processor to perform a second charging process for charging a battery in response to the voltage drop indicating a presence of the terminal resistance between the drain terminal and the ground.

7. The method according to claim 5, wherein the charging process is a first charging process, and the method further comprising:
configuring the processor to perform a second charging process for charging a battery in response to the voltage drop indicating a presence of the terminal resistance having a second terminal resistance value between the drain terminal and the ground,
wherein the second terminal resistance value of the terminal resistance is greater than the first terminal resistance value.

8. The method according to claim 1, wherein the method further comprises:
ascertaining with the processor whether the digital signal, received from A/D convertor, indicates that the RESU comprises the supercapacitor or a battery.

9. The method according to claim 1, wherein the charger comprises a cradle configured to hold and charge the RESU.

10. The method according to claim 1, wherein the charger comprises a cradle configured to hold and charge the RESU while the RESU is connected to a barcode scanner.

11. The method according to claim 1, wherein the charging process is a first charging process, and the method further comprises:
in response to determining that the voltage drop across the terminal resistance does not indicate the short-circuit, identifying the type of the RESU as a battery and configuring, based on the digital signal, the processor to perform a second charging process for the battery.

12. A charging system for a barcode scanner, comprising:
a rechargeable energy storage unit (RESU); and
a charger comprising a detection circuit configured to interface with a pin on the RESU and to output a digital signal corresponding to a terminal resistance (Rt) at the pin, wherein the detection circuit comprises a MOSFET comprising a gate terminal, a source terminal, and a drain terminal, wherein the source terminal is connected to a power source and the drain terminal is connected to a first end of a current-limiting resistor, wherein a second end of the current-limiting resistor is connected to an analog to digital (A/D) convertor and to a ground through the terminal resistance at the pin of the RESU,
wherein the digital signal indicates a voltage drop across the terminal resistance (Rt) and the voltage drop across the terminal resistance indicates a type of the RESU,
wherein, in response to a determination that the voltage drop across the terminal resistance indicates a short-circuit, the detection circuit is configured to identify that the type of RESU is a supercapacitor and a processor is configured, based on the digital signal, to perform a charging process for the supercapacitor,
wherein the determination that the voltage drop across the terminal resistance indicates the short-circuit comprises determining that the voltage drop between the drain terminal and the ground corresponds to approximately zero ohms, and
wherein the short-circuit indicates a first terminal resistance value of the terminal resistance as approximately zero ohms.

13. The charging system according to claim 12, wherein the pin provides the terminal resistance of a circuit element in the RESU when the RESU comprises the supercapacitor.

14. The charging system according to claim 12, wherein the processor is configured to ascertain whether the digital signal, received from A/D convertor, indicates that the RESU comprises the supercapacitor or a battery, wherein the battery comprises one or more lithium-ion batteries.

15. The charging system according to claim 14, wherein the charger is configured to:
charge the supercapacitor using the charging process when the processor selects the charging process; or
charge the battery using a different charging process when the processor selects the different charging process.

16. The charging system according to claim 12, wherein the processor is configured to select the charging process for charging the supercapacitor in response to the voltage drop indicating the short-circuit between the drain terminal and the ground.

17. The charging system according to claim 12, wherein the charging process is a first charging process, and wherein the processor is configured to select a second charging process for charging a battery in response to the voltage drop indicating a presence of the terminal resistance between the drain terminal and the ground.

18. The charging system according to claim 12, wherein the first terminal resistance value at the pin when the RESU comprises the supercapacitor and a second terminal resistance value at the pin when the RESU comprises a battery differ by more than 1000 ohms.

19. The charging system according to claim 18, wherein the second terminal resistance value of the terminal resistance is greater than the first terminal resistance value.

20. The charging system according to claim 12, wherein the charger comprises a cradle having a housing configured to mechanically and electrically mate with the RESU, and wherein the housing contains the detection circuit and the processor.

* * * * *